(12) United States Patent
Talarico et al.

(10) Patent No.: US 11,856,607 B2
(45) Date of Patent: Dec. 26, 2023

(54) CWS ADJUSTMENT FOR NR SYSTEMS OPERATING ON UNLICENSED SPECTRUM

(71) Applicant: Apple Inc., Cupertino, CA (US)

(72) Inventors: Salvatore Talarico, Sunnyvale, CA (US); Gang Xiong, Portland, OR (US); Yingyang Li, San Francisco, CA (US); Yongjun Kwak, Portland, OR (US); Carlos H. Aldana, Aalborg (DE)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 17/438,572

(22) PCT Filed: Mar. 13, 2020

(86) PCT No.: PCT/US2020/022646
§ 371 (c)(1),
(2) Date: Sep. 13, 2021

(87) PCT Pub. No.: WO2020/186166
PCT Pub. Date: Sep. 17, 2020

(65) Prior Publication Data
US 2022/0183063 A1 Jun. 9, 2022

Related U.S. Application Data

(60) Provisional application No. 62/818,376, filed on Mar. 14, 2019.

(51) Int. Cl.
*H04W 74/08* (2009.01)
*H04W 76/28* (2018.01)
*H04L 1/1812* (2023.01)
*H04L 5/00* (2006.01)
*H04W 74/00* (2009.01)

(52) U.S. Cl.
CPC ....... *H04W 74/0816* (2013.01); *H04L 1/1812* (2013.01); *H04L 5/0053* (2013.01); *H04W 74/008* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2017/0005768 A1 | 1/2017 | Yin et al. | |
| 2018/0115981 A1 | 4/2018 | Kim et al. | |

(Continued)

FOREIGN PATENT DOCUMENTS

| | | |
|---|---|---|
| EP | 3664562 A1 | 6/2020 |
| WO | 20190027271 A1 | 2/2019 |

OTHER PUBLICATIONS

PCT Search Report dated Jun. 12, 2020 in connection with PCT Application No. PCT/US2020/022646.

(Continued)

*Primary Examiner* — Saumit Shah
(74) *Attorney, Agent, or Firm* — Eschweiler & Potashnik, LLC

(57) ABSTRACT

Systems, methods, and circuitries are provided for adjusting contention window size (CWS). An example method includes selecting a downlink (DL) burst transmitted by the gNB for use in determining the CWS and adjusting the CWS based on Hybrid Automatic Repeat Request (HARQ) feedback received with respect to the selected DL burst.

19 Claims, 6 Drawing Sheets

(56) References Cited

U.S. PATENT DOCUMENTS

2021/0160919 A1* 5/2021 Wang .................... H04W 74/08
2022/0167405 A1* 5/2022 Noh .................. H04W 72/0446

OTHER PUBLICATIONS

PCT Written Opinion dated Jun. 13, 2020 in connection with PCT Application No. PCT/US2020/022646.
Nokia et al: "Feature Lead's Summary #2 on Channel Access Procedures", 3GPP Draft; R1-1903705; vol. RAN WG1; Mar. 3, 2019; URL:http://www.3gpp.org/ftp/tsg%5Fran/WG1%5FRL1/TSGR1%5F96/Docs/R1%2D1903705%2Ezip.
Ericsson: "Channel access mechanisms for NR-U", 3GPP Draft; R1-1902883; vol. RAN WG1; Feb. 16, 2019; URL:http://www/3gpp.org/ftp/tsg%5Fran/WG1%5FRL1/TSGR1%5F96/Docs/R1%2D1902883%2Ezip.
3rd Generation Partnership Project; "Technical Specification Group Radio Access Network"; Study on NR-based access to unlicensed spectrum (Release 16); 3GPP TR 38.889 V16.0.0; Dec. 2018.

* cited by examiner

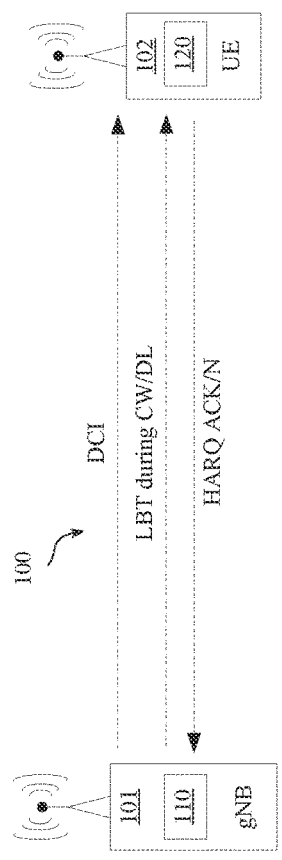
FIG. 1
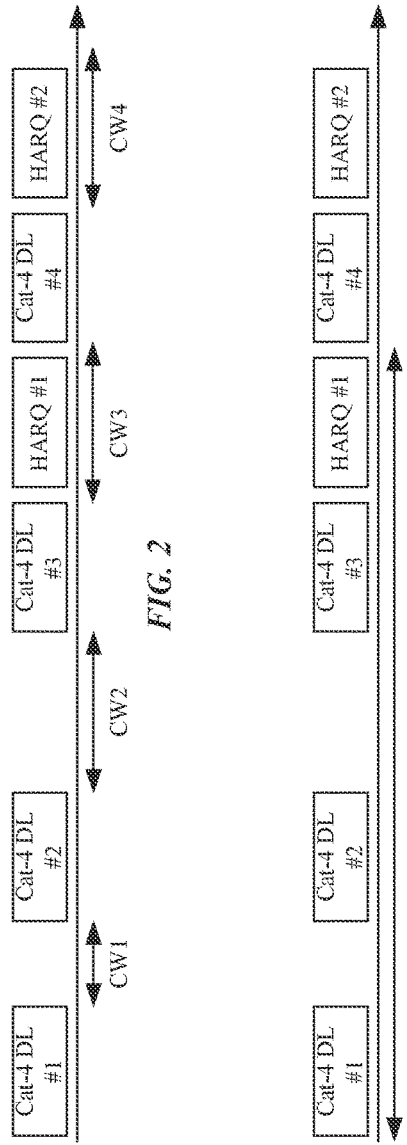
FIG. 2
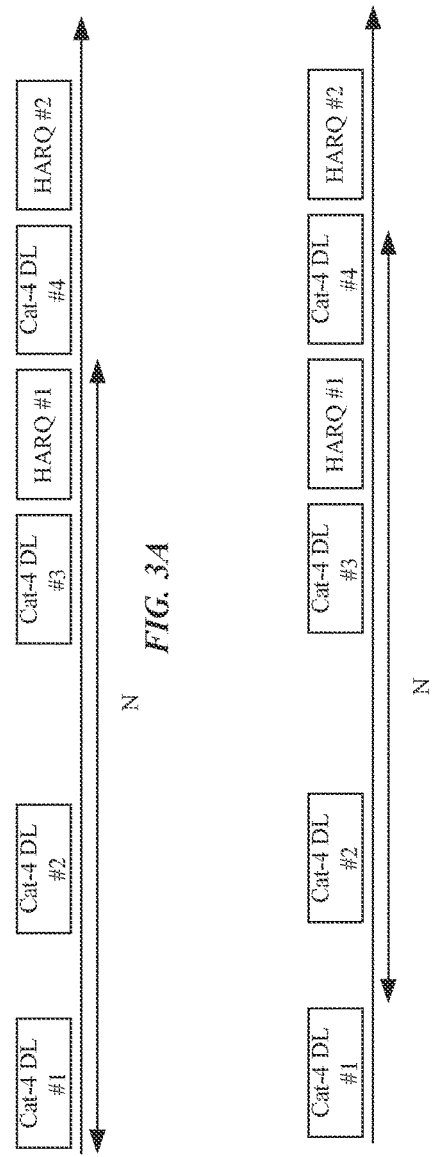
FIG. 3A
FIG. 3B

CWS ADJUSTMENT FOR NR SYSTEMS OPERATING ON UNLICENSED SPECTRUM

CROSS REFERENCE TO RELATED APPLICATIONS

This application is a National Phase entry application of International patent Application No. PCT/US2020/022646 filed Mar. 31, 2020, which claims priority to U.S. Provisional Patent Application No. 62/818,376 filed on Mar. 14, 2019, entitled "CWS ADJUSTMENT FOR DL TRANSMISSION FOR STANDALONE MODE IN NR SYSTEMS OPERATING ON UNLICENSED SPECTRUM," which is incorporated herein by reference for all purposes.

BACKGROUND

Each year, the number of mobile devices connected to wireless networks significantly increases. Adjustments are being made to system requirements in order to able to meet these demands. Three system capabilities that may be enhanced in order to support a significant increase in traffic are larger bandwidth, lower latency, and higher data rates.

One limiting factor in wireless innovation is the availability of spectrum. To mitigate this, the unlicensed spectrum has been an area of interest to expand the availability of LTE. In this context, one enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

BRIEF DESCRIPTION OF THE DRAWINGS

Some examples of circuits, apparatuses and/or methods will be described in the following by way of example only. In this context, reference will be made to the accompanying Figures.

FIG. 1 is a block diagram illustrating exemplary DL communication in a wireless communication network, according to various aspects disclosed.

FIG. 2 is a timing diagram illustrating exemplary DL communication in a wireless communication network, according to various aspects disclosed.

FIG. 3A is a timing diagram illustrating exemplary DL communication in which a feedback timer is initiated at a beginning of a DL burst, according to various aspects disclosed.

FIG. 3B is a timing diagram illustrating exemplary DL communication in which a feedback timer is initiated at an end of a DL burst, according to various aspects disclosed.

DETAILED DESCRIPTION

Figure 4:
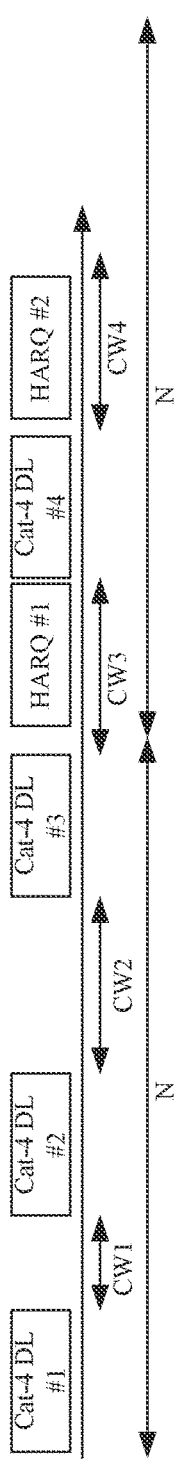
FIGS. 4-6 are timing diagrams illustrating various exemplary timer schemes, according to various aspects disclosed.

The present disclosure is described with reference to the attached figures. The figures are not drawn to scale and they are provided merely to illustrate the disclosure. Several aspects of the disclosure are described below with reference to example applications/use cases for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Enabling New Radio (NR)-based access to unlicensed spectrum may involve both physical layer aspects and physical layer procedures. The physical layer aspects include determining a frame structure with single and multiple downlink (DL) to uplink (UL) and UL to DL switching points within a shared channel occupancy time (COT) with the associated identified listen-before-talk (LBT) requirements. Another physical layer aspect is determining a UL data channel that includes an extension of the physical uplink shared channel (PUSCH) to support physical resource block (PRB)-based frequency block-interlaced transmission as well as support of multiple PUSCH(s) starting positions in one or multiple slot(s) depending on the LBT outcome with the understanding that the ending position is indicated by the UL grant. The PUSCH design should not require the user equipment (UE) device to change a granted transport block size (TBS) for a PUSCH transmission depending on the LBT outcome and should be based on CP-OFDM. Applicability of sub-PRB frequency block-interlaced transmission for 60 kHz could also be considered.

The physical layer procedure-based considerations for allowing unlicensed spectrum access for NR include, for load based equipment (LBE), a channel access mechanism that is in line with agreements from the NR-U study item (TR 38.889, Section 7.2.1.3.1). In addition, NR hybrid-automatic-repeat-request (HARQ) feedback mechanisms are the baseline for NR-U operation with extensions in line with agreements during the study phase (NR-U TR section 7.2.1.3.3), including immediate transmission of HARQ A/N for the corresponding data in the same shared COT as well as transmission of HARQ A/N in a subsequent COT. Support mechanisms to provide multiple and/or supplemental time and/or frequency domain transmission opportunities may also be considered.

Other physical layer procedure-based considerations include scheduling multiple transmission time intervals (TTIs) for PUSCH in a manner that is in-line with agreements from the study phase (TR 38.889, Section 7.2.1.3.3). NR Type-1 and Type-2 configured grant mechanisms are the baseline for NR-U operation with modifications in line with agreements during the study phase (NR-U TR section 7.2.1.3.4). Data multiplexing aspects (for both UL and DL) in light of LBT and channel access priorities should also be considered.

One of the challenges to adapting NR for unlicensed access is that the system should maintain fair coexistence with other incumbent technologies, and in order to do so, depending on the particular band in which it might operate, some restrictions might be taken into account when designing this system. For instance, if operating in the 5 GHz band, in some parts of the world, the LBT procedure is required to acquire the medium before a transmission can occur.

When operating the NR system on an unlicensed spectrum, before initiating any transmission the LBT procedure should be performed. In Rel-13 and Rel-14, some specific LBT priority classes, LBT parameters, and maximum channel occupancy time (MOOT) values were agreed and adopted in the related technical specification (TS).

FIG. 1 illustrates a wireless communication network 100 that includes a Next Generation node B (gNB) 101 and a user equipment device (UE 102). An example wireless communication network is described in more detail with reference to FIG. 12. The gNB includes DL circuitry 110 (e.g., a baseband processor or one or more processors) that is configured to generate and transmit DL data to the UE. The DL circuitry 110 is configured to generate and transmit downlink configuration information (DCI) that defines a set of parameters about an impending DL communication to the UE 102. The DCI may, for example, identify frequency and time resources that will be used to transmit the DL data and/or a type of HARQ feedback (e.g., ACK/NACK, NACK only, and so on) as well as one or more HARQ feedback opportunities (e.g., frequency and time resources to be used for multiple transmissions of HARQ feedback).

When operating in unlicensed spectrum, before transmitting DL data the DL circuitry 110 is configured to perform an LBT procedure in which the gNB 101 is caused to monitor the DL channel (e.g., PUSCH) during a contention window (CW) having a contention window size (CWS) that is defined as will be described below. If no other transmissions on the monitored channel occur during the CW, the gNB 101 is caused to transmit the DL transmission.

Figure 13:
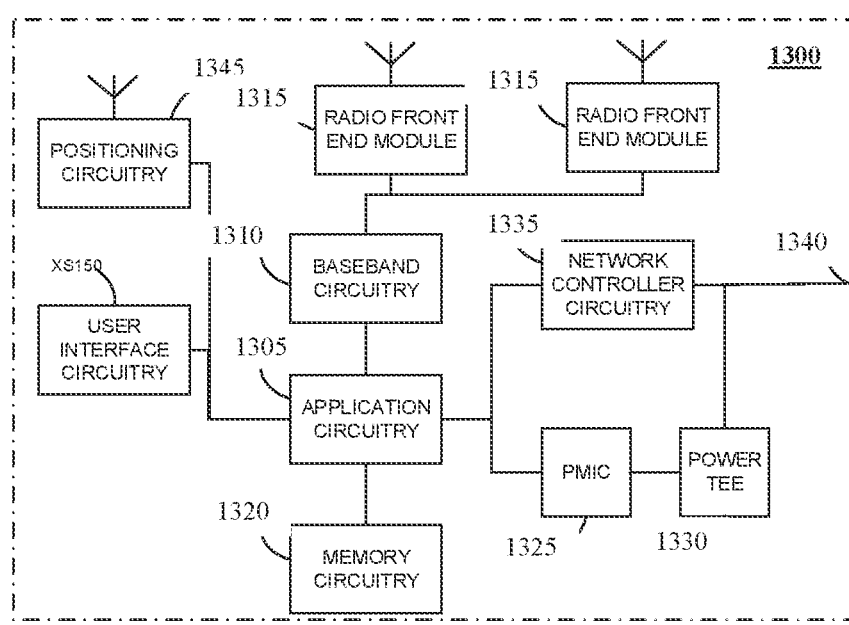
FIG. 13 illustrates an example of an infrastructure equipment device (e.g., gNB), in accordance with various aspects disclosed.
Figure 14:
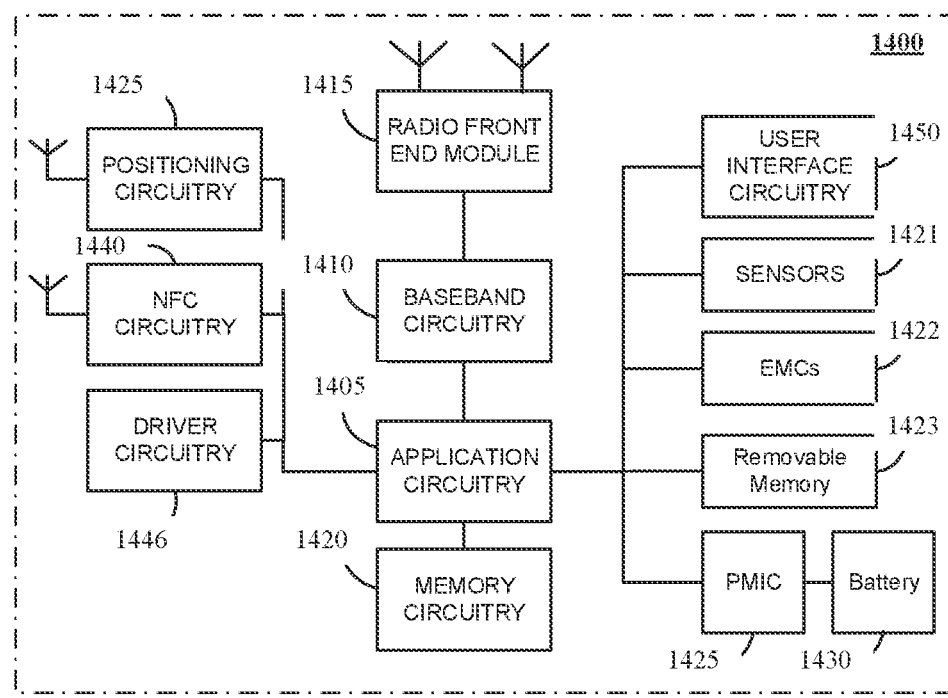
FIG. 14 illustrates an example of a user equipment device (e.g., UE), in accordance with various aspects disclosed.

The UE 102 monitors the DL resources that were indicated in the DCI to receive the DL data. The UE 102 includes HARQ circuitry 120 (e.g., a baseband processor or one or more processors) configured to provide the specified type of HARQ to the gNB 101 depending on whether the DL data is successfully received. FIGS. 13 and 14 illustrate example devices that may be used to implement the gNB 101 and the UE 102, respectively.

In legacy LAA, the DL the CWS is adapted based on the HARQ-ACK feedback. In particular, given a reference subframe set (which is the first DL subframe of the latest DL data burst for which HARQ-ACK feedback is available) the CWS is increased if at least 80% of the HARQ-ACK feedback values for a reference subframe are NACK. Otherwise, the CWS is reset to the minimum value.

In legacy LAA, this procedure was envisioned and agreed based on the assumption that the DL HARQ-ACK feedback would be always received on specific resources, and the HARQ-ACK feedback would not be subject to the LBT. However, in NR-U one of the scenarios that have been agreed is to deploy and operate NR-U in standalone mode. In this case, the UL channels as well as the DL channels will operate on unlicensed carriers, and will be subject to perform Category-4 (Cat-4) LBT (e.g., LBT using random back off and variable CWS), with the exception of the discovery reference signal (DRS) transmission for which Cat-2 LBT (e.g., LBT without random back off) is used. Therefore, the legacy CWS adjustment mechanism should be modified for NR. In this disclosure, several options on how to overcome this issue are provided.

When operating a cellular system on an unlicensed spectrum, the LBT procedure might be required by regional regulations, and a CWS adjustment procedure which maintains fair coexistence with other incumbent technologies should be employed. In LTE LAA, the CWS adjustment procedure is based on the HARQ-ACK feedback, and for DL it was designed under the assumption that the feedback would be only provided over a licensed carrier. However, NR-U is envisioned to operate also in standalone mode, where all the transmissions will be performed on unlicensed carriers, and subject to LBT. Therefore, for NR-U the CWS adjustment mechanism should be modified. In this disclosure, several options on how to overcome this issue are provided.

In Rel. 13, CWS is increased to the next higher value if at least 80% of the HARQ-ACK feedback values for a reference subframe set are NACK. Otherwise, the CWS is reset to the minimum value. In Rel. 13, the reference subframe is set to be the first DL subframe of the latest DL data burst for which HARQ-ACK feedback is available. That said, in Rel. 13 this set of rules was established under the assumption that the HARQ-ACK feedback would be provided solely throughout a licensed band.

In NR-U, one of the scenarios of deployment may be a standalone mode, where all the channels/transmissions will be performed on an unlicensed carrier and subject to LBT. In this case, due to LBT failures, the HARQ-ACK feedback for the reference burst (e.g., Cat-4 DL #1) may not be received or may be received later than expected. This may result in the gNB scheduling other DL transmissions and performing multiple Cat-4 DL bursts before the HARQ-ACK feedback corresponding to the previous DL transmission is received.

FIG. 2 illustrates an example where three consecutive Cat-4 DL bursts (e.g., Cat-4 DL #1-3) are performed without receiving any feedback information in between. The HARQ feedback information for the first DL burst (e.g., HARQ #1) is received after the third Cat-4 transmission. Thus, to support NR operation in unlicensed spectrum, the behavior of the gNB when the feedback is not received at the expected time or received after other transmissions should be defined.

FIGS. 3A-6 illustrate an example timer-based technique for defining the gNB's behavior in the absence of HARQ feedback at an expected time during operation in unlicensed spectrum. For the purposes of this description, an example timer has a length of N, where N can be given in symbols, slots, subframes, radio frames, or absolute times (e.g., milliseconds). In one example, N is fixed, or configurable through higher layer signaling. In one example, illustrated in FIG. 3A, the timer starts at the start of the previous Category-4 LBT transmission. In another example, illustrated in FIG. 3B, the time starts at the end of the previous Category-4 LBT transmission.

Figure 5:
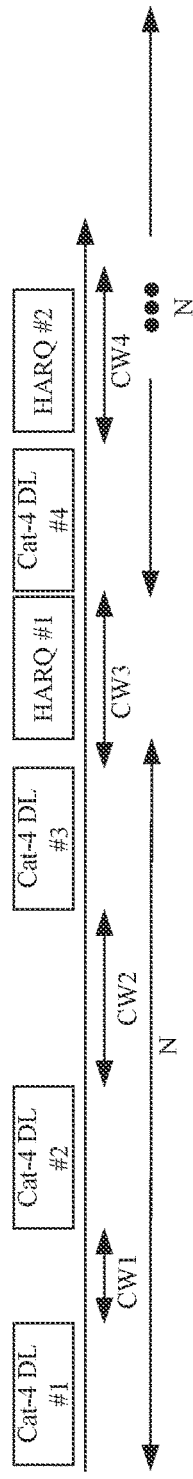
Figure 6:
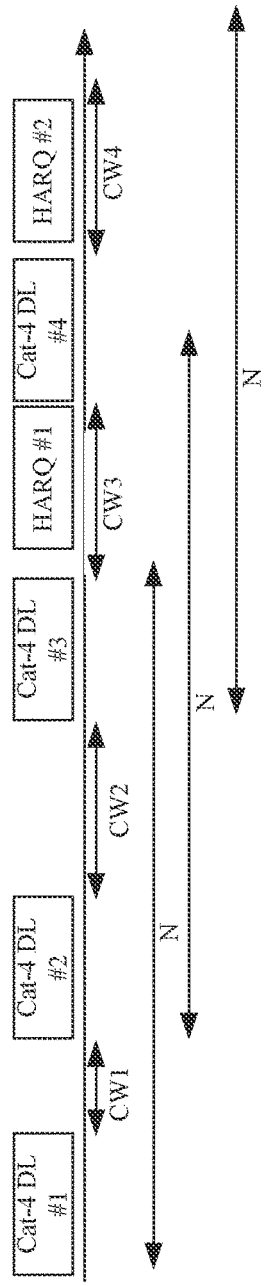

In one example, if there is at least one previous Cat-4 LBT DL transmission from which N (symbols/slots) have elapsed, and no HARQ-ACK feedback is received, then CWS is increased to the next higher value. In one example, such update should be applied only once the timer expires for all the Cat-4 LBT DL bursts performed within it. In this case, a new timer will be started either at the expiration of the previous timer (FIG. 4) or once a new Cat-4 LBT DL burst is performed (FIG. 5). In another example, for each Cat-4 DL burst transmission a new independent timer is started (FIG. 6).

In one example, the timer is reset to its initial value if one or more of the following conditions are satisfied: the timer expires; the HARQ-ACK feedback for one of the Cat-4 LBT DL transmissions that are received while the timer has not yet elapsed is received; the gNB has performed K consecutive LBT attempts for transmission, where K can be fixed, configurable, or left for gNB's implementation; or the CWS is adjusted.

In one example, if a new Cat-4 LBT DL transmission is initiated while the timer has not elapsed, and no feedback is received for any of the previous reference bursts, then the CWS can be left unchanged. In one example, if the HARQ-ACK feedback for one or more previous Cat-4 LBT DL transmission is received after the timer expired, while there was no feedback received prior to expiration of the timer, then the CWS is reverted to the value used to transmit the first burst of the previous Cat-4 LBT transmission(s) and the CWS is updated sequentially in order of the transmission of bursts. In this manner when the feedback indicates ACK for the reference PDSCH(s) of that burst, CWS is reset; else (when the feedback indicates NACK or there is no feedback), the CWS is increased (e.g., doubled).

In one example, the timer is initiated at the start or end of a Cat-4 LBT transmission, and it is reset once CWS is adjusted. In one example, the value of N may depend on one or more of the following: the max DL burst length, whether incumbent technology is absent or not, or subcarrier spacing.

In one example, the value of N is chosen such that it does not prohibit the full utilization of the allowed MOOT. In one example, the value of N corresponds to 6 ms or 10 ms depending on whether the absence of any other technology sharing the carrier can be guaranteed on a long term basis or not. In one example, the value of N can be picked such that after the completion of MOOT, there would be some time provisioned to the UE to send the corresponding HARQ-ACK feedback. In this manner, in one example, since for LBT priority class 4 the MOOT is 6 milliseconds or 10 milliseconds, if the absence of any other technology sharing the carrier can be guaranteed on a long term basis, N>6 milliseconds or N>10 milliseconds.

In one example, the value of N can be set to 0. In this case, regardless of whether the HARQ-ACK feedback is received before a new Cat-4 LBT transmission or not, the CWS can be updated before each transmission, or doubled if no HARQ-ACK feedback is received.

In one example, the value of N can be picked so that multiple HARQ feedback opportunities for the UE are allowed. In one example, the value of N can be configured, and it can be proportional to the number of feedback opportunities allowed. In one example, the value of N coincides with the DCI indication for the feedback opportunity timing. In particular, the value N can be determined in accordance with the PDSCH-to-HARQ-ACK_feedback timing indicator field in a corresponding DCI format or provided by dl-DataToUL-ACK if the PDSCH-to-HARQ-ACK feedback timing field is not present in the DCI format. For instance, the value N may be determined based on the difference between minimum and maximum value of dl-DataToUL-ACK which is configured by higher layers.

In one example, the procedure described above applies to the case when NR-U operates such that the UL channels are carried on unlicensed carrier(s) (e.g. standalone mode). In one example, if the CWS is changed while a Cat-4 LBT procedure is ongoing, the gNB draws a new random back-off counter and applies it to the ongoing LBT procedure.

In one example, the procedure described above applies to the case that HARQ-ACK transmissions of all UEs corresponding to a DL burst are to be started by a CAT-4 LBT. In one example, if the gNB is able to correctly decode the HARQ-ACK transmission corresponding to a DL burst from at least one UE, the gNB assumes HARQ-ACKs are received for the DL burst. Otherwise, UE assumes HARQ-ACKs are not received for the DL burst.

In one example, the gNB performs DTX (Discontinuous transmission) detection on UE's HARQ-ACK transmission. If HARQ-ACK transmissions of all UEs corresponding to a DL burst are judged as DTX, the procedure described above applies. On the contrary, if the gNB knows that at least one UE reports its HARQ-ACK using DTX (regardless of whether it is correctly decoded or not), the gNB assumes HARQ-ACKs are received for the DL burst.

In one example, the legacy DL CWS procedure is used, and no timer is introduced. In one example, the CWS is always updated before a new Cat-4 LBT based on the feedback information received. In one example, if the HARQ-ACK feedback is not received, the CWS is either increased or maintained the same until a feedback information is eventually received. In one example, once the HARQ-ACK feedback is received, then the CWS is reverted to the value used to transmit the first burst of such previous Cat-4 LBT transmission(s). Then the CWS is updated sequentially in order of the transmission of bursts such that when the feedback indicates ACK for the reference PDSCH(s) of that burst, CWS is reset or else (when the feedback indicates NACK or there is no feedback), the CWS is increased (e.g., doubled).

Figure 7:
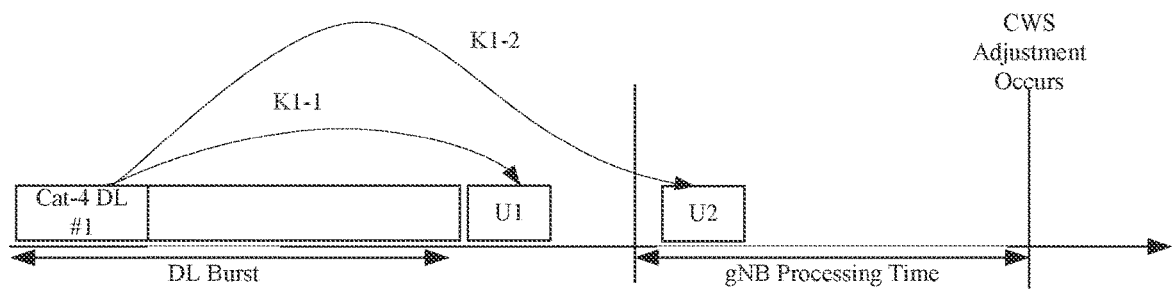
FIGS. 7-9 are timing diagrams illustrating various exemplary feedback opportunity timing and gNB processing time scenarios, according to various aspects disclosed.
Figure 8:
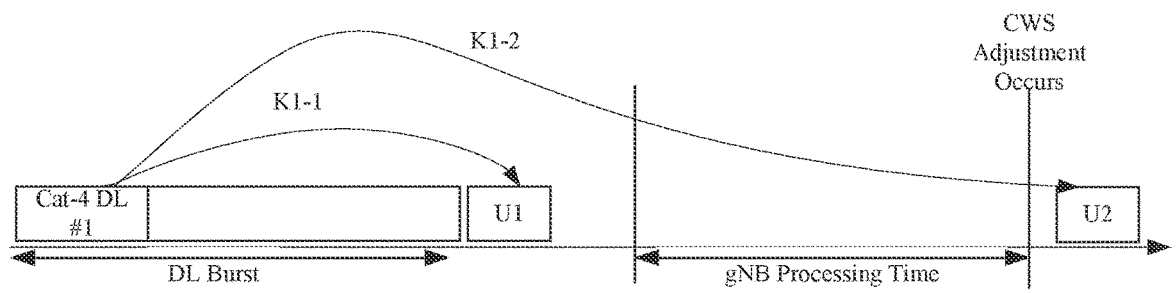
Figure 9:
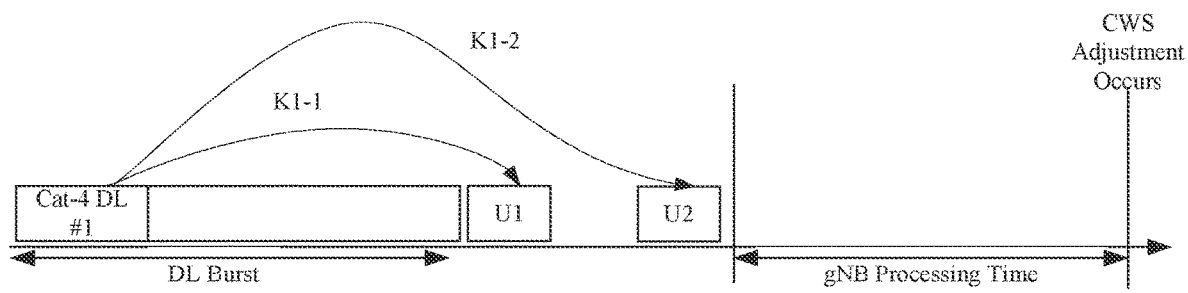

Independent of whether a timer is used, in one example, a DCI scheduling a PDSCH can indicate M different PDSCH-to-HARQ-ACK opportunities (e.g., timings), which gives the UE M opportunities (illustrated as U1 and U2 in FIGS. 7-9) to transmit HARQ-ACK to account for potential LBT failures. Over time a gNB may need to adjust the CWS, however it is possible that the gNB may not receive or be able to process any HARQ-ACK feedback in the last opportunity (e.g., U2) within the M PDSCH-to-HARQ-ACK opportunities. FIG. 7 illustrates the case when gNB is not able to decode the HARQ-ACK information in U2 for the CWS adjustment due to the processing time. FIG. 8 illustrates the case when the CWS adjustment is done earlier than the receipt of U2, so HARQ-ACK information in U2 cannot be used in the CWS adjustment. However, in both FIGS. 7 and 8, the gNB is able to get the HARQ-ACK information in U1. FIG. 9 illustrates the case when the HARQ-ACK information in both U1 and U2 could be available at the gNB.

To address the issue illustrated in FIGS. 7-9, in one example, a reference burst used for the CWS adjustment should be selected such that there is enough processing time for the gNB to process the HARQ-ACK transmission occurring within all the M PDSCH-to-HARQ-ACK opportunities related to at least one PDSCH transmission that occurred within the reference burst. For example, the DL burst #1 in FIG. 7 or FIG. 8 should not be the reference burst for the CWS adjustment because the timing of PDSCH-to-HARQ-ACK opportunity U2 occurs during or after the gNB processing time used to adjust the CWS. Rather, the gNB should use a most recent DL burst satisfying the timing of PDSCH-to-HARQ-ACK opportunities as related to gNB processing time as illustrated in FIG. 9.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

Figure 10:
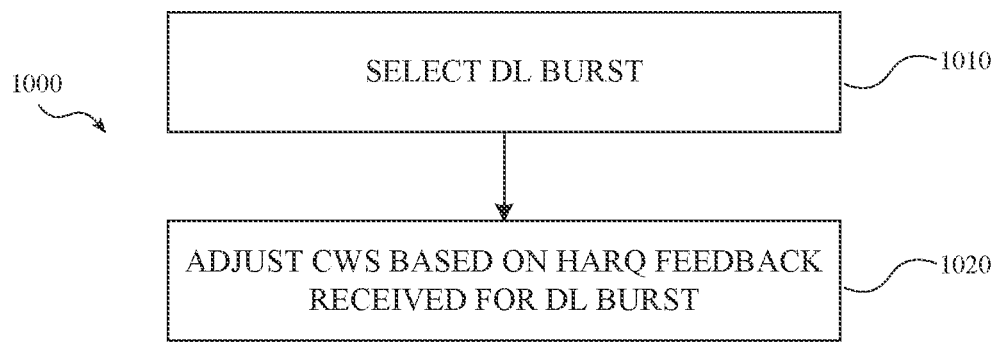
FIG. 10 is a flow diagram illustrating an exemplary method for adjusting a contention window size, according to various aspects disclosed.

FIG. 10 depicts a flow diagram outlining a method 1000 for adjusting a CWS. The method 1000 may be performed, for example, by DL circuitry 110 of FIG. 1 and/or baseband circuitry 1310 of FIG. 13. The method includes, at 1010, selecting a downlink (DL) burst transmitted by the gNB for use in determining a contention window size (CWS). At 1020, the CWS is adjusted based on Hybrid Automatic Repeat Request (HARQ) feedback received with respect to the selected DL burst.

In one example, the DL burst is selected based on a timing of a last HARQ opportunity designated for the DL burst. In this example the method 1300 includes selecting a first DL burst in response to determining that the timing of the last HARQ opportunity for the DL burst occurs prior to a beginning of a gNB processing time for adjusting the CWS; and not selecting a second DL burst in response to determining that the timing of the last HARQ opportunity for the DL burst occurs during or after a gNB processing time for adjusting the CWS.

Figure 11:
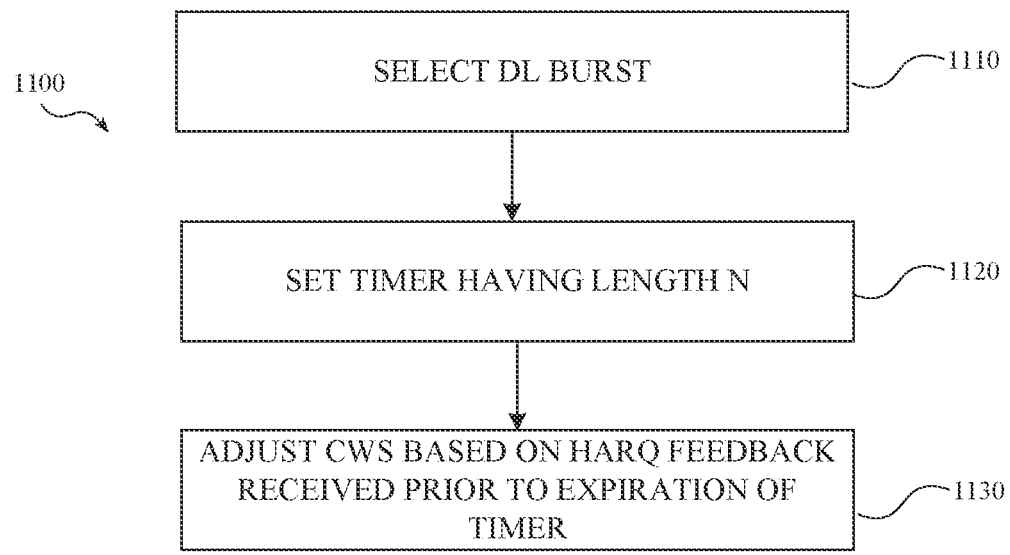
FIG. 11 is a flow diagram illustrating an exemplary method for adjusting a contention window size using a timer, according to various aspects disclosed.

FIG. 11 depicts a flow diagram outlining a method 1100 for adjusting a CWS based on a timer. The method 1100 may be performed, for example, by DL circuitry 110 of FIG. 1 and/or baseband circuitry 1310 of FIG. 13. The method includes, at 1110, selecting a downlink (DL) burst transmitted by the gNB for use in determining a contention window size (CWS). A timer having length N is set at 1120. At 1130, the CWS is adjusted based on Hybrid Automatic Repeat Request (HARQ) feedback received prior to expiration of the timer.

Figure 12:
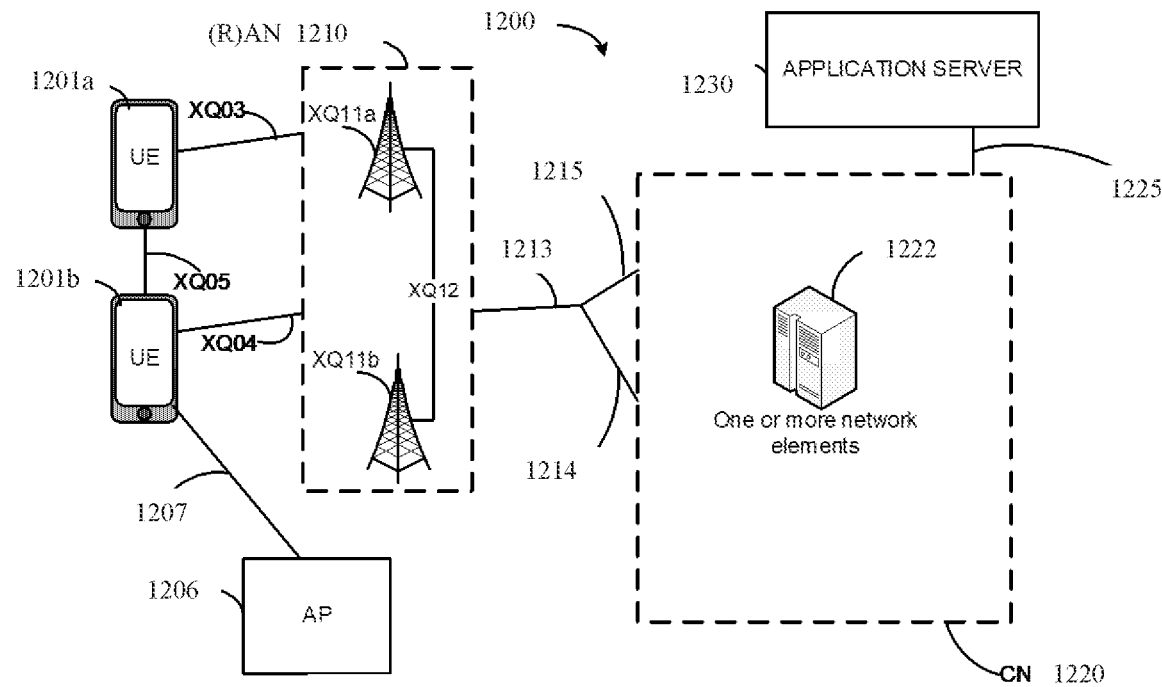
FIG. 12 illustrates an example communication network, in accordance with various aspects disclosed.

FIG. 12 illustrates an example architecture of a system 1200 of a communication network, in accordance with various embodiments. The following description is provided for an example system 1200 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 12, the system 1200 includes UE 1201a and UE 1201b (collectively referred to as "UEs 1201" or "UE 1201"). In this example, UEs 1201 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1201 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 may be configured to connect, for example, communicatively couple, with a RAN 1210. In embodiments, the RAN 1210 may be an NG RAN or a 5G RAN, an E-UTRAN, or a legacy RAN, such as a UTRAN or GERAN. As used herein, the term "NG RAN" or the like may refer to a RAN 1210 that operates in an NR or 5G system 1200, and the term "E-UTRAN" or the like may refer to a RAN 1210 that operates in an LTE or 4G system 1200. The UEs 1201 utilize connections (or channels) 1203 and 1204, respectively, each of which comprises a physical communications interface or layer (discussed in further detail below).

In this example, the connections 1203 and 1204 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1201 may directly exchange communication data via a ProSe interface 1205. The ProSe interface 1205 may alternatively be referred to as a SL interface 1205 and may comprise one or more logical channels, including but not limited to a PSCCH, a PSSCH, a PSDCH, and a PSBCH.

The UE 1201*b* is shown to be configured to access an AP 1206 (also referred to as "WLAN node 1206," "WLAN 1206," "WLAN Termination 1206," "WT 1206" or the like) via connection 1207. The connection 1207 can comprise a local wireless connection, such as a connection consistent with any IEEE 802.11 protocol, wherein the AP 1206 would comprise a wireless fidelity (Wi-Fi®) router. In this example, the AP 1206 is shown to be connected to the Internet without connecting to the core network of the wireless system (described in further detail below). In various embodiments, the UE 1201*b*, RAN 1210, and AP 1206 may be configured to utilize LWA operation and/or LWIP operation. The LWA operation may involve the UE 1201*b* in RRC_CONNECTED being configured by a RAN node 1211*a-b* to utilize radio resources of LTE and WLAN. LWIP operation may involve the UE 1201*b* using WLAN radio resources (e.g., connection 1207) via IPsec protocol tunneling to authenticate and encrypt packets (e.g., IP packets) sent over the connection 1207. IPsec tunneling may include encapsulating the entirety of original IP packets and adding a new packet header, thereby protecting the original header of the IP packets.

The RAN 1210 can include one or more AN nodes or RAN nodes 1211*a* and 1211*b* (collectively referred to as "RAN nodes 1211" or "RAN node 1211") that enable the connections 1203 and 1204. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1211 that operates in an NR or 5G system 1200 (for example, a gNB), and the term "E-UTRAN node" or the like may refer to a RAN node 1211 that operates in an LTE or 4G system 1200 (e.g., an eNB). According to various embodiments, the RAN nodes 1211 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various embodiments, the UEs 1201 and the RAN nodes 1211 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1201 and the RAN nodes 1211 may operate using LAA, eLAA, and/or feLAA mechanisms. In these implementations, the UEs 1201 and the RAN nodes 1211 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1201 RAN nodes 1211, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1201, AP 1206, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MOOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1201 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1201. The PDCCH carries information about the transport format and resource allocations related to the PDSCH channel, among other things. It may also inform the UEs 1201 about the transport format, resource allocation, and HARQ information related to the uplink shared channel. Typically, downlink scheduling (assigning control and shared channel resource blocks to the UE 1201*b* within a cell) may be performed at any of the RAN nodes 1211 based on channel quality information fed back from any of the UEs 1201. The downlink resource assignment information may be sent on the PDCCH used for (e.g., assigned to) each of the UEs 1201.

The RAN 1210 is shown to be communicatively coupled to a core network—in this embodiment, core network (CN) 1220. The CN 1220 may comprise a plurality of network elements 1222, which are configured to offer various data and telecommunications services to customers/subscribers (e.g., users of UEs 1201) who are connected to the CN 1220 via the RAN 1210. The components of the CN 1220 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1220 may be referred to as a network slice, and a logical instantiation of a portion of the CN 1220 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

FIG. 13 illustrates an example of infrastructure equipment 1300 in accordance with various embodiments. The infrastructure equipment 1300 (or "system 1300") may be implemented as a base station, radio head, RAN node such as the RAN nodes 1211 and/or AP 1206 shown and described previously, application server(s) 1230, and/or any other element/device discussed herein. In other examples, the system 1300 could be implemented in or by a UE.

The system 1300 includes application circuitry 1305, baseband circuitry 1310, one or more radio front end modules (RFEMs) 1315, memory circuitry 1320, power management integrated circuitry (PMIC) 1325, power tee circuitry 1330, network controller circuitry 1335, network interface connector 1340, satellite positioning circuitry 1345, and user interface circuitry 1350. In some embodiments, the device 1300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1305 includes circuitry such as, but not limited to one or more processors (or processor cores), cache memory, and one or more of low drop-out voltage regulators (LDOs), interrupt controllers, serial interfaces such as SPI, 120 or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1305 may be coupled with or may include memory/storage elements and may be configured to execute instructions stored in the memory/storage to enable various applications or operating systems to run on the system 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1305 may comprise, or may be, a special-purpose processor/controller to operate according to the various embodiments herein. As examples, the processor(s) of application circuitry 1305 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1300 may not utilize application circuitry 1305, and instead may include a special-purpose processor/controller to process IP data received from an EPC or 5GC, for example.

User interface circuitry 1350 may include one or more user interfaces designed to enable user interaction with the system 1300 or peripheral component interfaces designed to enable peripheral component interaction with the system 1300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 13 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

FIG. 14 illustrates an example of a platform 1400 (or "device 1400") in accordance with various embodiments. In embodiments, the computer platform 1400 may be suitable for use as UEs 101, 1201, application servers 1230, and/or any other element/device discussed herein. The platform 1400 may include any combinations of the components shown in the example. The components of platform 1400 may be implemented as integrated circuits (ICs), portions thereof, discrete electronic devices, or other modules, logic, hardware, software, firmware, or a combination thereof adapted in the computer platform 1400, or as components otherwise incorporated within a chassis of a larger system. The block diagram of FIG. 14 is intended to show a high level view of components of the computer platform 1400. However, some of the components shown may be omitted, additional components may be present, and different arrangement of the components shown may occur in other implementations.

Application circuitry 1405 includes circuitry such as, but not limited to one or more processors (or processor cores), cache memory, and one or more of LDOs, interrupt controllers, serial interfaces such as SPI, 120 or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1405 may be coupled with or may include memory/storage elements and may be configured to execute instructions stored in the memory/storage to enable various applications or operating systems to run on the system 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1405 may include a general or special purpose processor, such as an A-series processor (e.g., the A13 Bionic), available from Apple® Inc., Cupertino, CA or any other such processor. The processors of the application circuitry 1405 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1405 may be a part of a system on a chip (SoC) in which the application circuitry 1405 and other components are formed into a single integrated circuit, or a single package.

The baseband circuitry 1410 may be implemented, for example, as a solder-down substrate including one or more integrated circuits, a single packaged integrated circuit soldered to a main circuit board or a multi-chip module containing two or more integrated circuits.

The platform 1400 may also include interface circuitry (not shown) that is used to connect external devices with the platform 1400. The external devices connected to the platform 1400 via the interface circuitry include sensor circuitry 1421 and electro-mechanical components (EMCs) 1422, as well as removable memory devices coupled to removable memory circuitry 1423.

A battery 1430 may power the platform 1400, although in some examples the platform 1400 may be mounted deployed in a fixed location, and may have a power supply coupled to an electrical grid. The battery 1430 may be a lithium ion battery, a metal-air battery, such as a zinc-air battery, an aluminum-air battery, a lithium-air battery, and the like. In some implementations, such as in V2X applications, the battery 1430 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an apparatus for a Next Generation Node B (gNB), including one or more processors configured to cause the gNB to: select a downlink (DL) burst transmitted by the gNB for use in determining a contention window size (CWS); and adjust the CWS based on Hybrid Automatic Repeat Request (HARQ) feedback received with respect to the selected DL burst.

Example 2 includes the subject matter of example 1, including or omitting optional elements, wherein the one or more processors are configured to cause the gNB to: select the DL burst based on a timing of a last HARQ opportunity designated for the DL burst, by: selecting a first DL burst in response to determining that the timing of the last HARQ opportunity for the first DL burst occurs prior to a beginning of a gNB processing time for adjusting the CWS; and not selecting a second DL burst in response to determining that the timing of the last HARQ opportunity for the second DL burst occurs during or after a gNB processing time for adjusting the CWS.

Example 3 includes the subject matter of example 1, including or omitting optional elements, wherein the DL burst includes a Category-4 listen-before-talk (LBT) burst.

Example 4 includes the subject matter of any one of examples 1-3, including or omitting optional elements, wherein the one or more processors are configured to cause the gNB to: set a timer having a length of N; and adjust the CWS based on HARQ feedback received prior to expiration of the timer.

Example 5 includes the subject matter of example 4, including or omitting optional elements, wherein N specifies a number of symbols, slots, subframes, radio frames, or time increments.

Example 6 includes the subject matter of example 4, including or omitting optional elements, wherein the one or more processors are configured to cause the gNB to start the timer at a beginning of the selected DL burst.

Example 7 includes the subject matter of example 4, including or omitting optional elements, wherein the one or more processors are configured to cause the gNB to start the timer at an end of the selected DL burst.

Example 8 includes the subject matter of example 4, including or omitting optional elements, wherein the one or more processors are configured to cause the gNB to: increase the CWS to a higher value when HARQ-acknowledge (ACK) feedback is not received prior to expiration of the timer.

Example 9 includes the subject matter of example 4, including or omitting optional elements, wherein the one or more processors are configured to cause the gNB to: decrease the CWS to a lower value when HARQ-acknowledge (ACK) feedback is not received prior to expiration of the timer.

Example 10 includes the subject matter of example 4, including or omitting optional elements, wherein the one or more processors are configured to cause the gNB to: set a subsequent timer at an expiration of the timer.

Example 11 includes the subject matter of example 4, including or omitting optional elements, wherein the one or more processors are configured to cause the gNB to: set a subsequent timer at a beginning of a first DL burst occurring after expiration of the timer.

Example 12 includes the subject matter of example 4, including or omitting optional elements, wherein the one or more processors are configured to cause the gNB to: set a subsequent timer at a beginning of each DL burst.

Example 13 includes the subject matter of example 4, including or omitting optional elements, wherein the one or more processors are configured to cause the gNB to: reset the timer to its initial value upon expiration of the timer.

Example 14 includes the subject matter of example 4, including or omitting optional elements, wherein the one or more processors are configured to cause the gNB to: reset the timer to its initial value in response to receiving HARQ-ACK feedback for a DL burst occurring prior to expiration of the timer.

Example 15 includes the subject matter of example 4, including or omitting optional elements, wherein the one or more processors are configured to cause the gNB to: reset the timer to its initial value in response to the gNB performing K consecutive LBT attempts.

Example 16 includes the subject matter of example 15, including or omitting optional elements, wherein K is fixed.

Example 17 includes the subject matter of example 15, including or omitting optional elements, wherein K is configurable.

Example 18 includes the subject matter of example 15, including or omitting optional elements, wherein K is selected by the gNB.

Example 19 includes the subject matter of example 4, including or omitting optional elements, wherein the one or more processors are configured to cause the gNB to: reset the timer to its initial value in response to the CWS being adjusted.

Example 20 includes the subject matter of example 4, including or omitting optional elements, wherein the one or more processors are configured to cause the gNB to: revert the CWS to a value used for transmission of the DL burst in response to receiving HARQ-ACK feedback for a reference physical downlink shared channel (PDSCH) of the DL burst after expiration of the timer.

Example 21 includes the subject matter of example 4, including or omitting optional elements, wherein the one or more processors are configured to cause the gNB to: increase the CWS in response to receiving HARQ-non-acknowledgement (NACK) feedback for a reference PDSCH of the DL burst after expiration of the timer.

Example 22 includes the subject matter of example 4, including or omitting optional elements, wherein the one or more processors are configured to cause the gNB to: double the CWS in response to receiving HARQ-non-acknowledgement (NACK) feedback for a reference PDSCH of the DL burst after expiration of the timer.

Example 23 includes the subject matter of example 4, including or omitting optional elements, wherein the one or more processors are configured to cause the gNB to: select a value of N based on a max DL burst length.

Example 24 includes the subject matter of example 4, including or omitting optional elements, wherein the one or more processors are configured to cause the gNB to: select a value of N based on a subcarrier spacing.

Example 25 includes the subject matter of example 4, including or omitting optional elements, wherein the one or more processors are configured to cause the gNB to: select a value of N based on a maximum channel occupancy time (MOOT).

Example 26 includes the subject matter of example 4, including or omitting optional elements, wherein the one or more processors are configured to cause the gNB to: select a value of N that is greater than the MOOT such that N includes sufficient time for a UE receiving the DL burst to send HARQ feedback after expiration of the MOOT.

Example 27 includes the subject matter of example 4, including or omitting optional elements, wherein the one or more processors are configured to cause the gNB to: select a value of N that is greater than 6 milliseconds.

Example 28 includes the subject matter of example 4, including or omitting optional elements, wherein the one or more processors are configured to cause the gNB to: select a value of N that is greater than 10 milliseconds.

Example 29 includes the subject matter of example 4, including or omitting optional elements, wherein the one or more processors are configured to cause the gNB to: set N to 0.

Example 30 includes the subject matter of example 4, including or omitting optional elements, wherein the one or more processors are configured to cause the gNB to: select a value of N based on a number of HARQ feedback opportunities specified for the DL burst.

Example 31 includes the subject matter of example 4, including or omitting optional elements, wherein the one or more processors are configured to cause the gNB to: select a value of N based on a number of HARQ feedback opportunities specified for the DL burst.

Example 32 includes the subject matter of example 4, including or omitting optional elements, wherein the one or more processors are configured to cause the gNB to: select a value of N based that is proportional to a number of HARQ feedback opportunities specified for the DL burst.

Example 33 includes the subject matter of example 4, including or omitting optional elements, wherein the one or more processors are configured to cause the gNB to: select a value of N based on downlink configuration information (DCI) format indication specifying a number of HARQ feedback opportunities for the DL burst.

Example 34 includes the subject matter of example 4, including or omitting optional elements, wherein the one or more processors are configured to cause the gNB to: select a value of N based on a PDSCH-to-HARQ-ACK_feedback timing indicator field in a DCI format that specifies a number of HARQ feedback opportunities for the DL burst.

Example 35 includes the subject matter of example 4, including or omitting optional elements, wherein the one or more processors are configured to cause the gNB to: select a value of N based on a value of a dl-DataToUL-ACK for the DL burst.

Example 36 includes the subject matter of example 4, including or omitting optional elements, wherein the one or more processors are configured to cause the gNB to: select a value of N based on a difference between a minimum value and a maximum value of a dl-DataToUL-ACK for the DL burst.

Example 37 includes the subject matter of example 1, including or omitting optional elements, wherein the one or more processors are configured to cause the gNB to: draw a new random back-off counter for an ongoing LBT procedure in response to adjusting the CWS during the ongoing LBT procedure.

Example 38 includes the subject matter of example 1, including or omitting optional elements, wherein the one or more processors are configured to cause the gNB to: adjust the CWS based on HARQ feedback received from a single user equipment device (UE) belonging to a set of UEs to which the DL burst was transmitted.

Example 39 includes the subject matter of example 1, including or omitting optional elements, wherein the one or more processors are configured to cause the gNB to: in response to determining that a UE uses discontinuous transmission (DTX) to report HARQ feedback, adjust the CWS in a same manner as when HARQ feedback is received independent of whether HARQ feedback is received from the UE.

Example 40 is method, including, with a Next Generation Node B (gNB): selecting a downlink (DL) burst transmitted by the gNB for use in determining a contention window size (CWS); and adjusting the CWS based on Hybrid Automatic Repeat Request (HARQ) feedback received with respect to the selected DL burst.

Example 41 includes the subject matter of example 40, including or omitting optional elements, including: selecting the DL burst based on a timing of a last HARQ opportunity designated for the DL burst, by: selecting a first DL burst in response to determining that the timing of the last HARQ opportunity for the first DL burst occurs prior to a beginning of a gNB processing time for adjusting the CWS; and not selecting a second DL burst in response to determining that the timing of the last HARQ opportunity for the second DL burst occurs during or after a gNB processing time for adjusting the CWS.

Example 42 includes the subject matter of example 40, including or omitting optional elements, wherein the DL burst includes a Category-4 listen-before-talk (LBT) burst.

Example 43 includes the subject matter of any one of examples 40-42, including or omitting optional elements, including: setting a timer having a length of N; and adjusting the CWS based on HARQ feedback received prior to expiration of the timer.

Example 44 includes the subject matter of example 43, including or omitting optional elements, wherein N specifies a number of symbols, slots, subframes, radio frames, or time increments.

Example 45 includes the subject matter of example 43, including or omitting optional elements, including starting the timer at a beginning of the selected DL burst.

Example 46 includes the subject matter of example 43, including or omitting optional elements, including starting the timer at an end of the selected DL burst.

Example 47 includes the subject matter of example 43, including or omitting optional elements, including: increasing the CWS to a higher value when HARQ-acknowledge (ACK) feedback is not received prior to expiration of the timer.

Example 48 includes the subject matter of example 43, including or omitting optional elements, including: setting a subsequent timer at an expiration of the timer.

Example 49 includes the subject matter of example 43, including or omitting optional elements, including: setting a subsequent timer at a beginning of a first DL burst occurring after expiration of the timer.

Example 50 includes the subject matter of example 43, including or omitting optional elements, including: setting a subsequent timer at a beginning of each DL burst.

Example 51 includes the subject matter of example 43, including or omitting optional elements, including: resetting the timer to its initial value upon expiration of the timer.

Example 52 includes the subject matter of example 43, including or omitting optional elements, including: resetting the timer to its initial value in response to receiving HARQ-ACK feedback for a DL burst occurring prior to expiration of the timer.

Example 53 includes the subject matter of example 43, including or omitting optional elements, including: resetting the timer to its initial value in response to the gNB performing K consecutive LBT attempts.

Example 54 includes the subject matter of example 53, including or omitting optional elements, wherein K is fixed.

Example 55 includes the subject matter of example 53, including or omitting optional elements, wherein K is configurable.

Example 44 includes the subject matter of example 53, including or omitting optional elements, wherein K is selected by the gNB.

Example 57 includes the subject matter of example 43, including or omitting optional elements, including: resetting the timer to its initial value in response to the CWS being adjusted.

Example 58 includes the subject matter of example 43, including or omitting optional elements, including: reverting the CWS to a value used for transmission of the DL burst in response to receiving HARQ-ACK feedback for a reference physical downlink shared channel (PDSCH) of the DL burst after expiration of the timer.

Example 59 includes the subject matter of example 43, including or omitting optional elements, including: increasing the CWS in response to receiving HARQ-non-acknowledgement (NACK) feedback for a reference PDSCH of the DL burst after expiration of the timer.

Example 60 includes the subject matter of example 43, including or omitting optional elements, including: doubling the CWS in response to receiving HARQ-non-acknowledgement (NACK) feedback for a reference PDSCH of the DL burst after expiration of the timer.

Example 61 includes the subject matter of example 43, including or omitting optional elements, including: selecting a value of N based on a max DL burst length.

Example 62 includes the subject matter of example 43, including or omitting optional elements, including: selecting a value of N based on a subcarrier spacing.

Example 63 includes the subject matter of example 43, including or omitting optional elements, including: selecting a value of N based on a maximum channel occupancy time (MOOT).

Example 64 includes the subject matter of example 43, including or omitting optional elements, including: selecting a value of N that is greater than the MOOT such that N includes sufficient time for a UE receiving the DL burst to send HARQ feedback after expiration of the MOOT.

Example 65 includes the subject matter of example 43, including or omitting optional elements, including: selecting a value of N that is greater than 6 milliseconds.

Example 66 includes the subject matter of example 43, including or omitting optional elements, including: selecting a value of N that is greater than 10 milliseconds.

Example 67 includes the subject matter of example 43, including or omitting optional elements, including: setting N to 0.

Example 68 includes the subject matter of example 43, including or omitting optional elements, including: selecting a value of N based on a number of HARQ feedback opportunities specified for the DL burst.

Example 69 includes the subject matter of example 43, including or omitting optional elements, including: select a value of N based on a number of HARQ feedback opportunities specified for the DL burst.

Example 70 includes the subject matter of example 43, including or omitting optional elements, including: selecting a value of N based that is proportional to a number of HARQ feedback opportunities specified for the DL burst.

Example 71 includes the subject matter of example 43, including or omitting optional elements, including: selecting a value of N based on downlink configuration information (DCI) format indication specifying a number of HARQ feedback opportunities for the DL burst.

Example 72 includes the subject matter of example 43, including or omitting optional elements, including: selecting a value of N based on a PDSCH-to-HARQ-ACK feedback timing indicator field in a DCI format that specifies a number of HARQ feedback opportunities for the DL burst.

Example 73 includes the subject matter of example 43, including or omitting optional elements, including: selecting a value of N based on a value of a dl-DataToUL-ACK for the DL burst.

Example 74 includes the subject matter of example 43, including or omitting optional elements, including: selecting a value of N based on a difference between a minimum value and a maximum value of a dl-DataToUL-ACK for the DL burst.

Example 75 includes the subject matter of example 43, including or omitting optional elements, including: drawing a new random back-off counter for an ongoing LBT procedure in response to adjusting the CWS during the ongoing LBT procedure.

Example 76 includes the subject matter of example 40, including or omitting optional elements, including: adjusting the CWS based on HARQ feedback received from a single user equipment device (UE) belonging to a set of UEs to which the DL burst was transmitted.

Example 77 includes the subject matter of example 40, including or omitting optional elements, including: in response to determining that a UE uses discontinuous transmission (DTX) to report HARQ feedback, adjusting the CWS in a same manner as when HARQ feedback is received independent of whether HARQ feedback is received from the UE.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An apparatus for a base station, comprising one or more processors configured to cause the base station to:
   select a first downlink (DL) burst transmitted by the base station for use in determining a contention window size (CWS) in response to determining that a timing of a last Hybrid Automatic Repeat Request (HARQ) opportunity designated for the first DL burst occurs prior to a beginning of a base station processing time for adjusting the CWS, wherein a second DL burst is not selected in response to determining that the timing of a last HARQ opportunity for the second DL burst occurs during or after a base station processing time for adjusting the CWS;
   set a timer having a length of N; and
   adjust the CWS based on HARQ feedback received prior to expiration of the timer with respect to the first DL burst.

2. The apparatus of claim 1, wherein the one or more processors are configured to cause the base station to:
   increase the CWS to a higher value when HARQ-acknowledge (ACK) feedback is not received prior to expiration of the timer.

3. The apparatus of claim 1, wherein the one or more processors are configured to cause the base station to:
   revert the CWS to a value used for transmission of the first DL burst in response to receiving HARQ-ACK feedback for a reference physical downlink shared channel (PDSCH) of the first DL burst after expiration of the timer.

4. The apparatus of claim 1, wherein the one or more processors are configured to cause the base station to:
   increase the CWS in response to receiving HARQ-non-acknowledgement (NACK) feedback for a reference PDSCH of the first DL burst after expiration of the timer.

5. The apparatus of claim 1, wherein the one or more processors are configured to cause the base station to:
   double the CWS in response to receiving HARQ-non-acknowledgement (NACK) feedback for a reference PDSCH of the first DL burst after expiration of the timer.

6. The apparatus of claim 1, wherein the one or more processors are configured to cause the base station to:
   draw a Previously Presented random back-off counter for an ongoing LBT procedure in response to adjusting the CWS during the ongoing LBT procedure.

7. The apparatus of claim 1, wherein the one or more processors are configured to cause the base station to:
   adjust the CWS based on HARQ feedback received from a single user equipment device (UE) belonging to a set of UEs to which the first DL burst was transmitted.

8. The apparatus of claim 1, wherein the one or more processors are configured to cause the base station to:

in response to determining that a UE uses discontinuous transmission (DTX) to report HARQ feedback, when HARQ feedback is not received adjust the CWS in a same manner as when HARQ feedback is received.

9. The apparatus of claim 1, wherein the one or more processors are configured to cause the base station to:
maintain the CWS at a current value when a new DL transmission is initiated while the timer has not elapsed and feedback for a previous DL burst has not been received.

10. A method, comprising, with a base station:
selecting a first downlink (DL) burst transmitted by the base station for use in determining a contention window size (CWS) in response to determining that a timing of a last Hybrid Automatic Repeat Request (HARQ) opportunity designated for the first DL burst occurs prior to a beginning of a base station processing time for adjusting the CWS, wherein a second DL burst is not selected in response to determining that the timing of a last HARQ opportunity for the second DL burst occurs during or after a base station processing time for adjusting the CWS;
setting a timer having a length of N; and
adjusting the CWS based on HARQ feedback received prior to expiration of the timer with respect to the first DL burst.

11. The method of claim 10, comprising:
increasing the CWS to a higher value when HARQ-acknowledge (ACK) feedback is not received prior to expiration of the timer.

12. The method of claim 10, comprising:
reverting the CWS to a value used for transmission of the first DL burst in response to receiving HARQ-ACK feedback for a reference physical downlink shared channel (PDSCH) of the first DL burst after expiration of the timer.

13. The method of claim 10, comprising:
increasing the CWS in response to receiving HARQ-non-acknowledgement (NACK) feedback for a reference PDSCH of the first DL burst after expiration of the timer.

14. The method of claim 10, comprising:
doubling the CWS in response to receiving HARQ-non-acknowledgement (NACK) feedback for a reference PDSCH of the first DL burst after expiration of the timer.

15. The method of claim 10, comprising:
drawing a Previously Presented random back-off counter for an ongoing LBT procedure in response to adjusting the CWS during the ongoing LBT procedure.

16. The method of claim 10, comprising:
adjusting the CWS based on HARQ feedback received from a single user equipment device (UE) belonging to a set of UEs to which the first DL burst was transmitted.

17. The method of claim 10, comprising:
in response to determining that a UE uses discontinuous transmission (DTX) to report HARQ feedback, when HARQ feedback is not received adjusting the CWS in a same manner as when HARQ feedback is received.

18. The method of claim 10, comprising:
decreasing the CWS to a lower value when HARQ-acknowledge (ACK) feedback is not received prior to expiration of the timer.

19. The method of claim 10, further comprising:
maintaining the CWS at a current value when a new DL transmission is initiated while the timer has not elapsed and feedback for a previous DL burst has not been received.

* * * * *